| United States Patent [19] | [11] 3,936,365 |
| Saunders et al. | [45] Feb. 3, 1976 |

[54] RADIATION CROSSLINKED BLOCK COPOLYMER BLENDS WITH IMPROVED IMPACT RESISTANCE

[75] Inventors: Frank L. Saunders, Midland; Ronald R. Pelletier, Bay City, both of Mich.

[73] Assignee: The Dow Chemical Company, Midland, Mich.

[22] Filed: May 28, 1974

[21] Appl. No.: 473,642

[52] U.S. Cl.. 204/159.2; 204/159.14; 260/29.7 UA; 260/876 R; 260/876 B; 260/879; 260/880 B
[51] Int. Cl.² .......................... C08F 2/46; C08F 8/00
[58] Field of Search ... 204/159.2; 260/876 B, 876 R

[56] References Cited
UNITED STATES PATENTS

| 3,113,912 | 12/1963 | Kraus et al. | 204/159.2 |
| 3,491,166 | 1/1970 | Childers et al. | 260/876 B |
| 3,534,965 | 10/1970 | Harrison et al. | 260/876 B |

*Primary Examiner*—Richard B. Turer
*Attorney, Agent, or Firm*—Michael S. Jenkins

[57] ABSTRACT

Polymer blends having high impact resistance after mechanical working are produced by blending together a non-elastomeric monovinylidene aromatic polymer such as polystyrene with an elastomeric copolymer, such as a block copolymer of styrene and butadiene, in the form of crosslinked, colloidal size particles.

10 Claims, No Drawings

RADIATION CROSSLINKED BLOCK COPOLYMER BLENDS WITH IMPROVED IMPACT RESISTANCE

BACKGROUND OF THE INVENTION

This invention relates to a method for making improved high impact polymer blends, particularly high impact blends of monovinylidene aromatic polymers with elastomeric polymers.

Heretofore high impact polymer compositions, such as impact polystyrene compositions, have been formed by first making an elastomeric polymer such as polybutadiene or styrene/butadiene copolymer, adding the elastomeric polymer to monovinylidene aromatic monomer such as styrene, and then polymerizing the monovinylidene aromatic monomer to form a graft copolymer comprising a polymer of the monovinylidene aromatic monomer grafted onto the polybutadiene. Also heretofore elastomeric copolymers have been mechanically blended with a monovinylidene aromatic polymer to improve impact resistance of the latter.

In the latter instance involving mechanical blending of the polymers, experience has shown that one or more properties of the polystyrene such as impact strength cannot be improved without substantial sacrifice of one or more other, often equally important, properties such as tensile strength and flexural modulus. In order to achieve improvement in impact strength while eliminating or at least minimizing the loss of other physical properties, low amounts of high performance rubbers such as the block copolymers of styrene and butadiene have been blended with the polystyrene.

However, even in view of such improved blends, it remains highly desirable to provide blends having further improved impact strength while retaining tensile strength and modulus comparable to polystyrene.

SUMMARY OF THE INVENTION

In accordance with the present invention, a polymer blend comprising a non-elastomeric monovinylidene aromatic polymer and an elastomeric copolymer of conjugated diene and monovinylidene aromatic monomer, said blend having improved impact resistance even after mechanical processing, is provided by the following method. This novel method comprises the steps of subjecting the elastomeric copolymer in the form of colloidal size particles to conditions sufficient to crosslink the copolymer, and combining the crosslinked copolymer particulate with the monovinylidene aromatic polymer. For the purposes of this invention, the term "elastomeric" means a substance capable of being extended to twice its own length at 68°C by applying a stress and on release of the stress returns with force to approximately its original length.

Surprisingly, the impact resistance of the polymer blend prepared by the aforementioned method and then mechanically worked as is typical in polymer fabrication is superior to the impact resistance of a polymer blend of the same components which is prepared under conditions which do not crosslink the elastomeric copolymer.

The resultant high impact polymer blends produced by the method of this invention are useful in generally any application known for high impact polymers such as rubber-modified polystyrene compositions. For example, the polymer blends produced in accordance with this invention can be employed in making appliance housings, furniture, luggage shells, tote boxes, architectural trim, translucent covers for light fixtures and the like.

DETAILED DESCRIPTION OF PREFERRED EMBODIMENTS

The non-elastomeric monovinylidene aromatic polymer is intended to mean one or more polymerized monovinylidene aromatic compounds of the benzene series such as styrene, α-methylstyrene, t-butylstyrene, vinyl toluene, vinyl xylene, ethyl vinyl benzene, chlorostyrene, ethyl vinyl toluene, isopropenyl toluene, diethyl vinyl benzene. Also included are copolymers of at least about 70 weight percent of one or more of such monovinylidene aromatic monomers with up to 30 weight percent of other ethylenically unsaturated monomers copolymerizable with the monovinylidene aromatic compound such as acrylonitrile, methacrylonitrile, acrylic acid, methacrylic acid, maleic anhydride, vinyl chloride, vinylidene chloride, methyl methacrylate, ethyl acrylate, acrylamide, butadiene, isoprene and the like. The preferred monovinylidene aromatic polymers are polystyrene, polyvinyl toluene, styrene/vinyl toluene copolymers, and copolymers of about 70 to about 75 weight percent styrene and about 25 to about 30 weight percent of acrylonitrile. Such preferred polymers have molecular weights and physical property characteristics such that they can be employed alone for fabrication by molding, extrusion, etc. into articles of hardness, toughness and utility as exemplified by polystyrene presently in such commercial uses. Accordingly, such preferred polymers have molecular weights of at least 50,000, by the Staudinger viscosity method (Schildknecht, "Vinyl and Related Polymers," New York, Wiley, 1952, pp. 30–31). Such polymers may be prepared by any of the well-known polymerization processes disclosed in the prior art.

The elastomeric copolymers employed in the present invention are preferably polyvinylaromatic-polydiene block copolymers having an A-B configuration and polyvinylaromatic-polydiene-polyvinylaromatic block copolymers having an ABA configuration and hereinafter referred to as A-B block copolymers and A-B-A block copolymers. Other block copolymers of polyvinylaromatic and polydiene blocks are suitably employed as the elastomeric block copolymer in the present invention. It is further understood that blends of the foregoing block copolymers may also be suitably employed. Preferably the block copolymers have inherent viscosities of from about 0.6 to about 2.5 deciliters/gram (0.6 gram of copolymer per 100 grams of toluene at 25°C). Such block copolymers comprise from about 80 to about 20 weight percent of A-block, preferably from about 70 to about 30 weight percent, and from about 20 to about 80 weight percent of B-block, preferably from about 30 to about 70 weight percent.

The A-blocks are non-elastomeric polymer blocks of predominantly monovinylidene aromatic monomer or monomers such as styrene, α-methylstyrene, ar-methylstyrene, α,ar-dimethylstyrene, ar-t-butylstyrene, ar-chloro- and ar,ar-dichlorostyrene, ar-bromo- and ar,ar-dibromostyrene, vinyl naphthalene and others as described hereinbefore. The A-block advantageously has a molecular weight generally in the range of from about 10,000 to about 150,000.

The B-blocks are elastomeric polymer blocks of predominantly aliphatic conjugated diene or dienes such as 1,3-butadiene, isoprene, methylisoprene, and the like. The B-block advantageously has a molecular weight generally in the range of from about 40,000 to about 300,000.

The block copolymers can be made by processes involving the sequential formation of the individual blocks. More specifically, the copolymers are formed, for example, by (1) polymerizing monovinylidene carbocyclic aromatic monomer such as styrene in the presence of a lithium based initiator or a Ziegler type catalyst and (2) introducing aliphatic conjugated diene such as butadiene and permitting polymerization to continue until all of the monomer is consumed. Other suitable processes for making the block copolymer are described in *Journal of Polymer Science*, Part C, Polymer Symposia, No. 26 1969, Interscience Publishers.

In addition to the foregoing block copolymers, elastomeric graft copolymers of monovinylidene aromatic monomer and conjugated diene are also suitably employed as the elastomeric copolymer.

In the practice of the invention, the elastomeric copolymer, singularly or as a blend of the elastomeric copolymer and another elastomeric polymer such as a similar copolymer or polybutadiene, usually in the form of a mass or a polymer solution is preferably converted to a colloidal-size particulate in the following manner. The elastomeric copolymer is first dissolved in an organic liquid. Exemplary solvents are the cyclic alkanes such as cyclopentane, cyclohexane, cycloheptane, and the like; aromatic hydrocarbons such as benzene, toluene, naphthalene and xylene; acyclic alkanes such as n-pentane, n-hexane, n-heptane, n-octane, iso-octane; other solvents such as methyl ethyl ketone, tetrahydrofuran, and methylene chloride and mixtures thereof.

Solutions of the elastomeric copolymer advantageously contain from about 5 to about 30 weight percent of the block copolymer, preferably from about 10 to about 15 weight percent.

The resulting solutions are then emulsified in an aqueous emulsifying medium in amounts such that the volume ratio of polymer solution to aqueous emulsifying medium is in the range of from about 1:0.5 to about 1:1.5. By "aqueous emulsifying medium" is meant water containing an emulsifying amount of surface active agent, usually from about 0.2 to about 5 weight percent based on the medium of the surface active agent preferably from about 0.4 to about 1 weight percent. The concentration of surface active agent is usually dependent on the volume ratio of polymer solution to aqueous medium, the viscosity of the polymer solution and the nature of the surface active agent. Surface active agents which are particularly useful for successful practice of this invention are anionic emulsifiers or mixtures thereof with non-ionic emulsifiers. Examples of suitable anionic emulsifiers and non-ionic emulsifiers for this purpose are set forth in *McCutcheon's Detergents and Emulsifiers*, Allured Pub. Co., Ridgewood, N.J. (1970 Annual).

Emulsification is effected by subjecting the combined polymer solution and aqueous medium to high shear agitation conditions commonly employed in emulsifying polymer solutions in aqueous media. Emulsification is successfully accomplished using a colloid mill, a homogenizer or similar high shear dispersing device. The foregoing is merely illustrative, as the particular method or means of emulsification is not critical and does not form an essential aspect of the present invention.

Following formation of the emulsion as described, the organic liquid solvent and excess water are removed by conventional flashing techniques to form a stable latex containing from about 25 to about 60 weight percent of polymer solids wherein the particles of the dispersed phase (polymer particles) are colloidal size, e.g., in the range from about 0.2 to about 5 micrometers, preferably from about 0.5 to about 2 micrometers.

The desired crosslinking of the elastomeric copolymer is suitably achieved by any conventional means including use of chemical crosslinking agents such as peroxygen compounds, e.g., t-butyl peroxide, and azo compounds, e.g., azobisisobutyronitrile; heat, irradiation or combination thereof with irradiation being the preferred means.

Preferably irradiation is effected by subjecting a latex of the elastomeric copolymer to high energy radiation obtainable from any of various high energy sources and can be of various types whether regarded as having corpuscular or wave form. By the term "high energy radiation" is meant a high intensity radiation having a voltage greater than 0.3 mev., preferably from about 1 to about 10 mev. Representative types of radiation suitable for the purposes of this invention are alpha rays, beta rays, gamma rays, X-rays, electron beams, high energy neutrons and the like including radiations such as thermal neutron.

The dosage of radiation employed in the method of this invention is that dosage which is sufficient to enable (strengthen) the elastomeric copolymer to remain as a colloidal size particulate during the subsequent mechanical processing which is common in polymer fabrication, but which is less than that dosage which would destroy the elastomeric (rubbery) characteristic of the elastomeric copolymer. While suitable dosages vary with different elastomeric copolymers, it is generally observed that dosaages are suitably in the range from about 5 to about 15 megarads, preferably from about 5 to 10 megarads. In order to avoid destruction of the elastomeric character of the elastomeric copolymer, the dosage of radiation should be less than that providing a gel content in the elastomeric copolymer of 65 weight percent, preferably less than that providing a gel content of 55 weight percent. The required high energy radiation can be supplied from any of the well-known sources such as cobalt or cesium sources. Examples are the electro-mechanical devices for producing high velocity particles such as a Van de Graaff generator, a resonant transformer, a cyclotron, a betatron, a synchrotron, a synchrocylotron, or a linear accelerator, X-ray tubes, and radioactive isotopes emitting beta particles (high-velocity electrons) and/or gamma rays. Irradiation of the colloidal-size particulate is carried out under conditions of temperature, etc., such that the particles retain their discrete character and original colloidal size.

It is understood that, if a means other than irradiation is chosen to effect crosslinking of the elastomeric copolymer, the degree of crosslinking should be that which is sufficient to enable the elastomeric copolymer to remain as a colloidal size particulate during the subsequent mechanical processing, but which is less than that which would destroy its elastomeric (rubbery) characteristic.

In one embodiment, the latex of the irradiated elastomeric copolymer can be blended with a latex of the monovinylidene aromatic polymer. The desired polymer blend is recovered from the latex blend as described hereinafter. Alternatively, the crosslinked block copolymer latex is recovered from the latex in the form of the desired colloidal-size particulate prior to blending with monovinylidene aromatic polymer.

Preferably, recovery is accomplished by conventional freeze-drying techniques which comprise the steps of (a) freezing the latex to a frozen mass, usually at temperatures from about −10° to about −20°C, and (b) drying the frozen mass under vacuum to remove water. Suitably, the latex may be recovered by other conventional means such as by salt coagulation, freeze-thaw destabilization, spray drying, etc. so long as the recovered block copolymer remains in the form of discrete, colloidal-size particles or agglomerates thereof that can be readily redispersed. When the latex is to be recovered by destabilizing, the colloidal-size copolymer particles of the destabilized latex are separated from the latex serum by filtration and then drying under conditions which allow the collected particles to remain as discrete particles.

If not mixed in latex form, the non-elastomeric, monovinylidene aromatic polymer and the colloidal size particles of the crosslinked elastomeric copolymer can be mixed or blended in any conventional manner which provides an intimate mixture of the components. Generally, blending in an internal mixer is preferred such as a Banbury, twin screw extruder, Brabender Plastograph, or the like, but an open mill can be employed. Also, mixing in an inert atmosphere can also be carried out as desired. Mixing temperatures can vary widely but will generally be in the range of from about 250° to about 600°, preferably from about 300° to about 500°F, with mixing times in the range of from about 30 seconds to about 30 minutes, preferably from about 1 to about 20 minutes.

The amount of elastomeric copolymer combined with the non-elastomeric polymer is at least that amount which measurably improves the impact strength of the non-elastomeric polymer. Preferably, the amount of elastomeric copolymer is in the range from about 5 to about 40 weight parts per 100 weight parts of the non-elastomeric polymer.

In order that the primary advantages of this invention over the prior art methods be realized, the blend or mixture of non-elastomeric polymer and the elastomeric copolymer is subjected to mechanical processing at some point after the colloidal size particles of the elastomeric copolymer have been crosslinked. For the purposes of this invention, the term "mechanical proocessing" means working the aforementioned blend to a degree sufficient to degrade (break down) colloidal size particles of non-crosslinked elastomeric copolymer. Examples of mechanical processing include the mechanical mixing or blending of the polymers in the dry state as described hereinbefore as well as fabricating the polymers into articles of desired shape by extrusion. It is found that further crosslinking of the elastomeric copolymer may occur during mechanical processing. In most instances, this additional cross-linking is beneficial. However conditions of mechanical processing should be chosen so that excessive cross-linking causing loss of elastomeric characteristics does not occur.

The following examples are set forth to illustrate the invention and should not be construed to limit its scope. In the examples, all parts and percentages are by weight unless otherwise indicated.

EXAMPLE 1

A polymer solution containing 10.2% of styrene/butadiene (70/30) A-B block copolymer ($[\eta]_{inh} = 1.4$) in benzene is emulsified in water containing 3.0 percent sodium dodecyl benzene sulfonate and 0.83 percent nonylphenylethylene oxide (1 mole:9 moles) adduct based on copolymer by using a homogenizer. The ratio of oil phase to aqueous phase is 1.65:1.0. The resulting emulsion is then stripped of solvent and concentrated to 53 percent latex polymer solid in a rotating evaporator under reduced pressure.

A portion (Sample No. 1) of the resulting latex is subjected to gamma radiation to a total dose of 10 megarads at a rate of 125 kilorads/hour using a cobalt source. The crosslinked copolymer is recovered from the latex as a colloidal-size particulate by freeze-drying technique using a dry ice-methylene chloride bath to freeze the latex following which water is removed from latex under vacuum of 5 mm Hg.

Another portion (Sample No. A) of the latex which is not irradiated is similarly recovered as a colloidal-size particulate.

The recovered portions are blended on compounding rolls for 6 minutes at 160°C with polystyrene having a molecular weight of 280,000 at a ratio of 25 parts of block copolymer to 75 parts of polystyrene. The resulting polymer blends are compression molded at 185°C for 5 minutes to give test specimens which are measured for physical properties as indicated in Table I.

Also for purposes of comparison (Sample No. B), 75 parts of the polystyrene is blended with the non-irradiated block copolymer in massive form and molded into test specimens which are tested for physical properties as indicated in Table I.

TABLE I

| Sample No. | Yield Strength, psi (1) | Yield Elong., % (2) | Rupture Strength, psi (3) | Rupture Elong., % (4) | Tensile Mod.×10$^5$, psi (5) | Vicat Heat Distortion, °C (6) | Izod Impact Strength, ft.-lbs/in. notch (7) |
|---|---|---|---|---|---|---|---|
| 1 | 4500 | 1.65 | 4435 | 1.71 | 3.31 | 102 | 1.89 |
| A* | 5521 | 1.83 | 5460 | 1.90 | 3.7 | 102 | 0.16 |
| B* | 4263 | 1.25 | 4185 | 1.26 | 3.59 | 101 | 0.28 |

*Not an example of the invention.
(1)–(5) ASTM D-638.
(6) ASTM D-1525-70.
(7) ASTM D-256 Method A.

EXAMPLE 2

A polymer solution containing 10.2 percent styrene/butadiene (ABA type) block copolymer (~15:70:15 ABA wherein A represents styrene block and B represents butadiene block) in benzene is emulsified in water containing 3.0 percent sodium dodecylbenzene sulfonate and 0.83 percent nonylphenol-9-mole ethylene oxide adduct by using a homogenizer. The ratio of oil phase to aqueous phase is 1.54:1.0. The resulting emulsion is stripped of solvent and concentrated to 53.3 percent solids in a rotating evaporator under reduced pressure.

A portion (Sample No. 1) of the resulting latex is irradiated and recovered as described in Example 1. For purposes of comparison, another portion (Sample No. C) of the latex which is not irradiated is similarly recovered. The recovered portions are blended with polystyrene and molded as described in Example 1 and tested for physical properties which are recorded in Table II. A portion of the recovered irradiated latex is tested for gel content and gel swell ratio and the results are also recorded in Table II.

TABLE II

| Sample No. | 1 | C* |
|---|---|---|
| Yield Strength, Yield, psi (1) | 2537 | No Yield |
| % Elongation (2) | 1.26 | None |
| Rupture Strength Yield, psi (3) | 2512 | 2328 |
| % Elongation (4) | 13.8 | 1.6 |
| Tensile Modulus × 10$^5$, psi(5) | 2.96 | 2.04 |
| Vicat Heat Distortion, °C(6) | 99 | 103 |
| Impact Strength, ft. lbs/in(7) | 1.86 | 0.82 |
| Block Copolymer % Gel (8) | 48 | 0 |
| Gel Swell Ratio (9) | 34 | ∞ |

*Not an example of the invention.
(1)–(7) Same as in Table I.
(8)–(9) A sample of the irradiated latex of the block copolymer is dried under vacuum at 60°C to constant weight and 0.5 g of dried polymer is placed in 50 ml of toluene in a closed glass bottle for 70 hours at room temperature. The amount of copolymer solubilized in the sample is determined. The remainder is the gel content expressed as percent of the original sample. The swell ratio is determined as the weight of the gel fraction containing the imbibed toluene divided by the weight of the dried gel fraction.

EXAMPLE 3

The aqueous polymer dispersion of the block copolymer as prepared in Example 1 [irridiated (Sample No. 1) and non-irradiated (Sample No. C)] is blended with a polystyrene latex (50 percent solids) in the ratio to give a polymer blend composition of 25 percent block copolymer/75 percent polystyrene on dry weight basis. The polymer is isolated from these latex blends by removal of water under vacuum at 60°C. The resulting polymer is compounded on rolls at 165°C for 7 minutes and then compression molded into test samples at 185°C and 30 tons for 2 minutes. The resulting samples are then tested for physical properties which are recorded in Table III.

TABLE III

| Sample No. | 1 | C* |
|---|---|---|
| Rupture Strength Yield, psi (3) | 4362 | 4505 |
| % Elongation(4) | 1.7 | 1.6 |
| Tensile Modulus(5), lbs/in$^2$ | 3.2 | 3.45 |
| Vicat Point (6), °C | 104 | 103 |
| Impact Strength (7), ft. lbs/in | 1.45 | 0.41 |
| Block Copolymer % Gel (8) | 51 | 0 |
| Gel Swell Ratio (9) | 22 | ∞ |

*Not an example of the invention.
(3)–(7) Same as in Table I.
(8)–(9) Same as in Table II.

EXAMPLE 4

A 40 percent solids latex of styrene/butadiene (A/B type, 30/70) block copolymer ($[\eta]_{inh} = 1.5$) is made by emulsifying a 10 percent benzene solution of the copolymer in accordance with the procedure of Example 1. The resulting latex is divided into three portions. The first and second portions are subjected to γ-radiation in doses of 5 and 10 megarads respectively. Each of the three latex portions are blended with polystyrene latex (50 percent solids) in the ratio to give a polymer blend composition of 25 parts of block copolymer per 75 parts of polystyrene on a dry weight basis.

The polymer component of each of the resulting blends is isolated by removal of water under vacuum and dried. Each of the recovered dried polymers is milled on compounding rolls for 7 minutes at 165°C and then compression molded into test samples at 185°C and 30 tons pressure for 2 minutes. The resulting samples are then tested for physical properties which are recorded in Table IV.

TABLE IV

| Sample No. | 1 | 2* | C* |
|---|---|---|---|
| Radiation Dosage, megarad | 5 | 10 | 0 |
| Tensile Strength Yield(1),lbs/in$^2$ | 3303 | 0 | 2882 |
| % Elongation(2) | 1.67 | 0 | 1.43 |
| Rupture Strength Break(3),lbs/in$^2$ | 2269 | 3572 | 2509 |
| % Elongation(4) | 26.5 | 1.8 | 17.3 |
| Tensile Mod.(5),lbs/in$^2$ | 2.64×10$^5$ | 2.71×10$^5$ | 2.6×10$^5$ |
| Vicat Point(6),°C. | 104 | 104 | 104 |
| Impact Strength (7), ft.lbs/in | 3.79 | 0.48 | 0.91 |
| Block Copolymer % Gel (8) | 10 | 78 | 0 |
| Gel Swell Ratio (9) | 60 | 17.8 | ∞ |

*Not an example of the invention.
(1)–(7) Same as in Table I.
(8)–(9) Same as in Table II. Analysis of the block copolymer of Sample No. 1 after milling on compounding rolls indicates a gel content of 41.2%.

What is claimed is:

1. A method for improving the impact resistance of a normally solid non-elastomeric monovinylidene aromatic polymer which is subjected to mechanical processing, said method comprising the steps of (1) subjecting colloidal size particles of an elastomeric block copolymer of from about 20 to about 80 weight percent of an elastomeric block of conjugated diene and from about 80 to about 20 weight percent of a non-elastomeric block of monovinylidene aromatic monomer to high energy irradiation sufficient to effect crosslinking of the block copolymer and (2) combining an amount of the resulting irradiated block copolymer particulate with the non-elastomeric monovinylidene aromatic polymer containing at least 70 weight percent of polymerized monovinylidene aromatic monomer wherein the amount of copolymer is sufficient to improve the impact strength of the non-elastomeric polymer, said crosslinking being sufficient to enable the block copolymer to remain in the form of colloidal size particles during mechanical processing, but less than that required to render the copolymer non-elastomeric.

2. The method of claim 1 wherein the copolymer is subjected to high intensity radiation having a voltage greater than 0.3 mev employing conditions sufficient to crosslink the copolymer with a radiation dose in the range from about 5 to about 15 megarads.

3. The method of claim 2 wherein the non-elastomeric polymer is polystyrene.

4. The method of claim 3 wherein the elastomeric copolymer is a block copolymer of polystyrene block and polybutadiene block in which the block copolymer is present in the amount of from about 5 to about 40 weight parts per 100 weight parts of the non-elastomeric polymer.

5. The method of claim 1 wherein the non-elastomeric polymer and elastomeric polymer are combined by blending together latexes of the polymers.

6. A blend of non-elastomeric monovinylidene aromatic polymer and elastomeric block copolymer of conjugated diene and nonovinylidene aromatic monomer prepared by the method of claim 1.

7. The method of claim 4 wherein the dose rate is 125 kilorads per hour using a cobalt source.

8. The method of claim 4 wherein the copolymer is block copolymer having an A-B configuration with the A-block representing the polystyrene block and the B-block representing the polybutadiene block.

9. The method of claim 8 wherein the dosage of radiation is less than that providing a gel content in the elastomeric copolymer of 55 weight percent.

10. The method of claim 9 wherein the elastomeric copolymer contains from about 30 to about 70 weight percent of the polymerized diene and from about 70 to about 30 weight percent of the polymerized aromatic monomer.

* * * * *